United States Patent [19]
Chalupa et al.

[11] Patent Number: 5,534,286
[45] Date of Patent: Jul. 9, 1996

[54] NO-FAT GELLAN GUM SPREAD

[75] Inventors: William F. Chalupa, Aurora, Ill.; George R. Sanderson, Carlsbad, Calif.

[73] Assignee: Monsanto Company, St Louis, Mo.

[21] Appl. No.: 252,307

[22] Filed: Jun. 1, 1994

[51] Int. Cl.$^6$ .................................................. A23L 1/0522
[52] U.S. Cl. ........................................ 426/573; 426/578
[58] Field of Search .................................. 426/573, 613, 426/578, 579, 658

[56] References Cited

U.S. PATENT DOCUMENTS

| | | | |
|---|---|---|---|
| 4,503,084 | 3/1985 | Baird et al. | 426/573 |
| 4,563,366 | 1/1986 | Baird et al. | 426/573 |
| 4,647,470 | 3/1987 | Sanderson et al. | 426/573 |
| 4,869,916 | 9/1989 | Clark et al. | 426/573 |
| 4,876,105 | 10/1989 | Wolf et al. | 426/573 |
| 4,882,187 | 11/1989 | Izzo et al. | 426/335 |
| 4,911,946 | 3/1990 | Singer | 426/658 |
| 4,956,193 | 9/1990 | Cain et al. | 426/573 |
| 5,002,785 | 3/1991 | Lew | 426/303 |
| 5,124,169 | 6/1992 | Kohara et al. | 426/573 |
| 5,190,927 | 3/1993 | Chang et al. | 436/101 |
| 5,252,352 | 10/1993 | Banach et al. | 426/580 |

FOREIGN PATENT DOCUMENTS

379747B1  10/1993  European Pat. Off. .

*Primary Examiner*—Jeanette Hunter

[57] ABSTRACT

The invention is a fat-free spread composition comprising water, non-gelling starch, gelling salt, nonfat milk solids, and gellan gum. The composition includes the following weight ratio amounts of ingredients:

81–95.9% water
2–11% non-gelling starch
1–3% gelling salt
1–3% nonfat milk solids
0.1–1.0% gellan gum.

9 Claims, No Drawings

NO-FAT GELLAN GUM SPREAD

BACKGROUND OF THE INVENTION

Food scientists are faced with a challenging task of producing a spread which has the texture, spreadability, and organoleptic properties similar to margarine but which contains less than 80% fat typically present in margarine. It is particularly difficult to attain the spreadability, body, texture, and taste of margarine in spreads containing 5% or less of fat, especially spreads containing practically no fat.

Several publications disclose margarine-like products having reduced fat levels, although each contains at least 5% fat. GB U.S. Pat. No. 2,229,077 discloses a margarine containing 5–30% fat mixture containing hardened fat, 8–15% maltodextrin, optionally 0.5–3% modified starch, 1–2% whey protein concentrate, and 0.4–0.6% gelatine. U.S. Pat. No. 4,497,834 discloses a dairy-based non-cheese food product, which may contain from 5 to 40% fat, 15 to 50% non-fat milk solids, and a stabilizer such as carboxymethylcellulose. U.S. Pat. No. 5,013,573 discloses spreads containing 20–90% fat and demineralized, deacidified milk.

U.S. Pat. No. 4,956,193 discloses an edible plastic dispersion containing 1–10% fat, which includes 9–12% maltodextrin and gelatin. U.S. Pat. No. 5,252,352 discloses extra low fat spreads having 0.1–5% fat, 9–12% casein, 0.5–3% whey proteins, 1–5% carbohydrates, 4–12% maltodextrin, and minor amounts of carboxymethylcellulose, guar gum, salt, locust bean gum, and gelatin. The low fat spreads require a dual gelling agent system for providing margarine-like properties as well as high levels of casein.

The present invention is a fat-free gellan gum spread product which has a smooth and creamy texture simulating the desirable characteristics of margarine. The gellan gum spread does not require the addition of another gelling agent such as a gelling protein or gelling starch.

The gellan gum spread product has a soft cutable structure that spreads easily when applied to foods such as toast, muffins, bagels, etc. The gellan gum spread product can also be used as a cheese, nut or vegetable spread, as a mayonnaise-like food, or, with addition of appropriate colorings and flavorings, as a dessert topping or filling.

SUMMARY OF THE INVENTION

The invention is a fat-free spread composition comprising water, non-gelling starch, gelling salt, nonfat milk solids, and gellan gum. The composition includes the following weight ratio amounts of ingredients:

81–95.9% water

2–11% non-gelling starch

1–3% gelling salt

1–3% nonfat milk solids 0.1–1.0% gellan gum

Other conventional food ingredients, including sequestrants, calcium releasing agents, preservatives, colorings, and flavorings, may be optionally included in the composition of the present invention to provide additionally desirable product characteristics In one class of this composition, the weight ratio amounts of the ingredients are 89–92% water, 3–7% non-gelling starch, 1–2% gelling salt, 1–2% nonfat milk solids, and 0.3–0.7% gellan gum.

Compositions of the invention can be prepared by a procedure whereby dry ingredients are combined in water and hydrated at an elevated temperature (e.g. between about 180° and 212° F.) during mixing. The mixture is then cooled to about 150°–160° F. and transferred to containers.

Illustrating this process, the composition of the invention is prepared by:

a) adding gellan gum and a major portion of non-gelling starch to a major portion of water to form a combination, and heating the combination, typically to between 180° and 212° F., preferably about 200° F., while mixing, typically in a high shear mixer at a rate of between about 700–800 rpm, to hydrate the starch and gellan gum;

b) adding gelling salt and nonfat milk solids to the heated combination while mixing the heated combination to form a mixture;

c) cooling the mixture to about 150°–160° F.;

d) adding the remaining portion of non-gelling starch and the remaining portion of water to the mixture and blending until uniform; and e) pouring the blended mixture into a container and allowing the blended mixture to set on further cooling.

A "major portion of non-gelling starch" means more than of the amount of non-gelling starch present in the final formulation. A "remaining portion of non-gelling starch" means the amount required to achieve the final formulation.

For example, if the composition of the invention being prepared contains 8% by weight of non-gelling starch, a "major portion of non-gelling starch" is more than 4% by weight of the composition, e.g. 5%. The "remaining portion of non-gelling starch" is the amount of non-gelling starch required to achieve the final formulation, e.g. 3%.

In one embodiment of this composition, the major portion s of non-gelling starch is at least 70% of the amount of non-gelling starch in the formulation. The remaining portion of non-gelling starch is 30% or less of the amount of non-gelling starch in the final formulation.

A "major portion of water" means more than 75% of the amount of water present in the final formulation. A "remaining portion of water" means the amount required to achieve the final formulation.

For example, if the composition of the invention being prepared contains 90% by weight of water, a "major portion of water" is more than 67.5% by weight of the composition, e.g. 70%. The "remaining portion of non-gelling starch" is the amount of non-gelling starch required to achieve the final formulation, e.g. 20%.

In one embodiment of this composition, the major portion of water is at least 88% of the amount of water in the formulation. The remaining portion of water is 12% or less of the amount of water in the final formulation.

Product texture, body, mouthfeel, spreadability and lubricity can be modified as desired by incorporating non-gelling starch and water components of the formulation at two stages in the process.

Alternatively, all starch and water can be added in step a) and step d) can be eliminated.

The mixture may be sheared while being cooled through the temperature range within which setting occurs and then filled into containers and allowed to further cool.

The process may additionally comprise dry blending one or more sequestrants and one or more preservatives with non-gelling starch and gellan gum, and adding flavoring, coloring, a calcium salt, and when the calcium salt is only soluble under acidic conditions, a calcium ion releasing agent to the mixture prior to cooling the mixture.

DETAILED DESCRIPTION OF THE INVENTION

The spreads of the invention are all fat free spreads having margarine-like body, texture, mouthfeel, and spreadability.

Non-gelling starches suitable for use in compositions of the present invention include starches having high amylopectin content (about 93% to 100% amylopectin, i.e. 0% to about 7% amylose). Glicksman, "Gum Technology in the Food Industry" Academic Press, New York, N.Y. (1969) reports the following typical amylose content of various starches.

TABLE 1

Amylose content of common starches

| Starch | Amylose content (%) |
|---|---|
| Potato | 22 |
| Tapioca | 17 |
| Arrowroot | 20 |
| Corn | 20–28 |
| Sorghum | 23–28 |
| Rice | 16–17 |
| Wheat | 17–27 |
| Oat | 23–24 |
| Waxy maize | 0–7 |
| Waxy sorghum | 0–7 |
| Waxy rice | 0–7 |
| Sago | 27 |

In Table 1, non-gelling starches are waxy maize, waxy sorghum, and waxy rice starch. Exemplary of waxy rice starch is Remyline AC rice starch (produced by Remy Industries SA (Belgium) and commercially available from A & B Ingredients, Inc. (Fairfield, N.J.)). Remyline AC rice starch has an amylopectin content of @98%. Preferably, the non-gelling starch is a waxy rice starch.

Gelling salts suitable for compositions of the present invention include salts having mono- or divalent ions, including sodium, potassium, calcium, or magnesium ions. In one embodiment of the invention, the gelling salts are sodium salts, e.g. sodium chloride.

Non-fat milk solids are essentially fat-free solids derived from milk, including milk protein and lactose. Such non-fat milk solids are commercially available as a powder from a number of suppliers, including Kerry Ingredients (Savage, Minn.), Land O' Lakes (Minneapolis, Minn.), and Erie Foods International (Rochelle, Ill.).

Gellan gum is available from Kelco, a Division of Merck & Co., Inc. (San Diego, Calif.) under the tradename KELCOGEL® (including KELCOGEL, KELCOGEL PC, and KELCOGEL F). Gellan gum is a heteropolysaccharide prepared by fermentation of *Pseudomonas elodea* ATCC 31461. Processes for preparing gellan gum include those described in U.S. Pat. Nos. 4,326,052 and 4,326,053.

Optionally, other commonly used food ingredients am used to provide additional beneficial food product characteristics, including sequestrants, calcium releasing agents, preservatives, colorings, and flavorings.

Sequestrants may be used in the present invention to remove divalent ions from the gum and the aqueous environment that act as inhibitors of gum hydration. Sequestrants which are suitable for compositions of the present invention include, but are not limited to, sodium citrate, sodium tripolyphosphate, sodium hexametaphosphate, disodium orthophosphate, and potassium citrate.

Calcium releasing agents, which lower system pH and are useful for releasing calcium ions from low-pH soluble calcium salts which enhance gellan gum gelation, are also optionally useful components of the composition of the invention. Lactic acid, in particular concentrated lactic acid (88%), is preferred for dairy products such as the spread of the present invention. Other calcium releasing agents include citric acid, ascorbic acid, adipic acid, and malic acid.

Preservatives, which inhibit yeast and mold growth, are useful for preserving compositions of the invention, and are also optionally useful components of the composition of the invention. Suitable preservatives include potassium sorbate, sodium benzoate, and sorbic acid.

Colorings, such as beta-carotene, FD & C grade yellow dye no. 4, and FD & C grade yellow dye no. 5, which simulate butter and margarine color, and flavorings which simulate butter and margarine flavor, are also optionally useful in the compositions of the present invention.

In the following examples, compositions of the present invention are prepared using conventional dry blending procedures and high shear (700–800 rpm) mixing. The first step involves dry blending gellan gum and a major portion of non-gelling starch to produce a non-gelling starch/gellan gum dry blend; adding the non-gelling starch/gellan gum blend to a major portion of water to form a combination, heating the combination to between 180° and 212° F., and mixing the heated combination, e.g. in a high shear mixer at a rate of between about 700–800 rpm to form a mixture. While mixing the heated combination, gelling salt and nonfat milk solids are dry blended to form a sodium chloride/nonfat milk solids blend which is added to the heated combination. The nonfat milk solids-containing heated combination is cooled to about 150°–160° F., and remaining portions of non-gelling starch and water are added to the cooled combination and blended until uniform. The uniform blend is poured into a container before cooling to below room temperature, or cooled through the setting temperature range and then filled into containers prior to further cooling.

Alternatively, all dry ingredients are added together in the beginning of the process to all of the water of the composition to form a mixture, followed by heating the mixture, and mixing the heated mixture in a high shear mixer. The heated mixture is then cooled while mixing, and subsequently poured into a container before cooling to below room temperature.

Compositions of the present invention may be further illustrated by the following examples, which should not be construed as limiting the scope or spirit of the invention.

EXAMPLES

Example 1

The following fat-free and emulsifier-free spread was prepared.

TABLE 2

| Ingredient | grams | weight % |
|---|---|---|
| water | 410.00 | 82.00 |
| Remyline AC rice starch | 25.00 | 5.00 |
| sodium chloride | 8.50 | 1.70 |
| nonfat milk solids | 7.50 | 1.50 |
| KELCOGEL F gellan gum | 2.50 | 0.50 |
| sodium citrate | 0.80 | 0.16 |
| butter flavor | 1.00 | 0.20 |
| lactic acid, 88% | 35 drops | |
| potassium sorbate | 0.60 | 0.12 |
| sodium benzoate | 0.50 | 0.10 |
| color | 0.10 | 0.02 |
| water | 35.00 | 7.00 |
| Remyline AC rice starch | 7.50 | 1.50 |

Procedure

1. Dry blend 25 grams rice starch, KELCOGEL, potassium sorbate, sodium benzoate, and sodium citrate.

2. Add blended ingredients to 410 ml water, and heat to about 200° F. to hydrate the blend, while mixing with a high shear mixer (700–800 rpm).

3. Dry blend sodium chloride with nonfat milk solids, and add to hot mixture while shearing.

4. Add butter flavor, color, and lactic acid, and cool mixture to 150°–160° F.

5. Slurry 7.5 grams rice starch and 35 grams water together, and add to mixture. Blend until uniform.

6. Pour mixture into appropriate containers, and cool to 40° F. Store in refrigerator until ready for use.

The finished product had a smooth, creamy texture that spreads easily when applied to foods such as toast, muffins, bagels, etc.

Example 2

The following fat-free and emulsifier-free spread was prepared.

TABLE 3

| Ingredient | grams | weight % |
| --- | --- | --- |
| water | 445.00 | 89.00 |
| Remyline AC rice starch | 32.50 | 6.50 |
| sodium chloride | 8.50 | 1.70 |
| nonfat milk solids | 7.50 | 1.50 |
| KELCOGEL F gellan gum | 2.50 | 0.50 |
| sodium citrate | 0.80 | 0.16 |
| butter flavor | 1.00 | 0.20 |
| lactic acid, 88% | 35 drops | |
| potassium sorbate | 0.60 | 0.12 |
| sodium benzoate | 0.50 | 0.10 |
| color | 0.10 | 0.02 |

Procedure

Using the same formulation as Example 1, all dry ingredients are combined and then added to water. The mixture is heated to about 200° F. to hydrate the blend, and mixed in a high hear mixer (700–800 rpm). The mixture is then cooled to 150°–160° F., and subsequently poured into a container before cooling to below room temperature.

Examples 3–6

Following the general procedure described in Example 1, spreads having the following formulations are prepared:

TABLE 4

| Ingredient | Example No. (weight %) | | | |
| --- | --- | --- | --- | --- |
| | 3 | 4 | 5 | 6 |
| water | 86.10 | 84.80 | 83.60 | 82.20 |
| Remyline AC rice starch | 2.50 | 3.00 | 4.00 | 5.00 |
| sodium chloride | 1.00 | 1.70 | 1.70 | 2.00 |
| nonfat milk solids | 2.00 | 1.50 | 1.50 | 1.00 |
| KELCOGEL F gellan gum | 0.30 | 0.40 | 0.60 | 0.70 |
| sodium citrate | 0.16 | 0.16 | 0.16 | 0.16 |
| butter flavor | 0.20 | 0.20 | 0.20 | 0.20 |
| lactic acid, 88% | (35 drops) | (35 drops) | (35 drops) | (35 drops) |
| potassium sorbate | 0.12 | 0.12 | 0.12 | 0.12 |
| sodium benzoate | 0.10 | 0.10 | 0.10 | 0.10 |
| color | 0.02 | 0.02 | 0.02 | 0.02 |

TABLE 4-continued

| Ingredient | Example No. (weight %) | | | |
| --- | --- | --- | --- | --- |
| | 3 | 4 | 5 | 6 |
| water | 7.00 | 7.00 | 7.00 | 7.00 |
| Remyline AC rice starch | 0.50 | 1.00 | 1.00 | 1.50 |

Examples 7–10

Following the general procedure described in Example 1, spreads having the following formulations are prepared:

TABLE 5

| Ingredient | Example No. (weight %) | | | |
| --- | --- | --- | --- | --- |
| | 7 | 8 | 9 | 10 |
| water | 91.10 | 89.80 | 88.60 | 87.20 |
| Remyline AC rice starch | 2.80 | 3.50 | 4.50 | 6.00 |
| sodium chloride | 1.00 | 1.70 | 1.70 | 2.00 |
| nonfat milk solids | 2.00 | 1.50 | 1.50 | 1.00 |
| KELCOGEL F gellan gum | 0.30 | 0.40 | 0.60 | 0.70 |
| sodium citrate | 0.16 | 0.16 | 0.16 | 0.16 |
| butter flavor | 0.20 | 0.20 | 0.20 | 0.20 |
| lactic acid, 88% | (35 drops) | (35 drops) | (35 drops) | (35 drops) |
| potassium sorbate | 0.12 | 0.12 | 0.12 | 0.12 |
| sodium benzoate | 0.10 | 0.10 | 0.10 | 0.10 |
| color | 0.02 | 0.02 | 0.02 | 0.02 |
| water | 2.00 | 2.00 | 2.00 | 2.00 |
| Remyline AC rice starch | 0.20 | 0.50 | 0.50 | 0.50 |

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following claims in determining the full scope of the invention.

What is claimed is:

1. A spread composition comprising 81–95.9% water, 2–11% non-gelling starch, 1–3% gelling salt, 1–3% nonfat milk solids, and 0.1–1.0% gellan gum.

2. A spread composition of claim 1 comprising 89–92% water, 3–7% non-gelling starch, 1–2% gelling salt, 1–2% nonfat milk solids, and 0.3–0.7% gellan gum.

3. A spread composition of claim 1 wherein the gelling salt is sodium chloride.

4. A spread composition of claim 1 wherein the non-gelling starch has an amylopectin content of between about 93–100%.

5. A spread composition of claim 4 wherein the non-gelling starch is a waxy rice starch.

6. A spread composition of claim 1 additionally comprising one or more sequestrants, a calcium ion releasing agent, one or more preservatives, flavoring and coloring.

7. A process for preparing a spread composition of claim 1 comprising:

a) adding gellan gum and a major portion of non-gelling starch to a major portion of water to form a combination, and hydrating the starch and gellan gum by heating the combination to between 180° and 212° F. while mixing;

b) adding gelling salt and nonfat milk solids to the heated combination while mixing the heated combination to form a mixture;

c) cooling the mixture to about 150°–160° F.;

d) adding the remaining portion of non-gelling starch and the remaining portion of water to the mixture and blending until uniform; and e) pouring the blended mixture into a container and allowing the blended mixture to set on further cooling.

8. A process of claim 7 wherein the non-gelling starch/gellan gum blend is heated to about 200° F.

9. A process of claim 8 wherein the major portion of starch is at least about 70% of the total amount of starch in the formulation, and wherein the major portion of water is at least about of the total amount in the formulation.

* * * * *